May 4, 1937. M. H. WARD 2,079,055
DEVICE FOR EXHAUSTING AND SEALING BELLOWS AND THE LIKE
Filed April 28, 1931 3 Sheets-Sheet 1

INVENTOR
Marshall H. Ward
BY
Prindle Bean & Mann
ATTORNEY

May 4, 1937. M. H. WARD 2,079,055
DEVICE FOR EXHAUSTING AND SEALING BELLOWS AND THE LIKE
Filed April 28, 1931 3 Sheets-Sheet 2
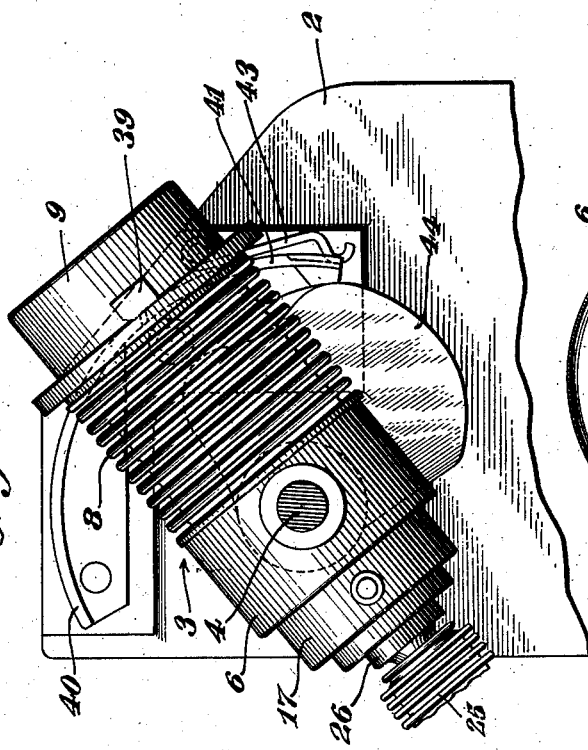
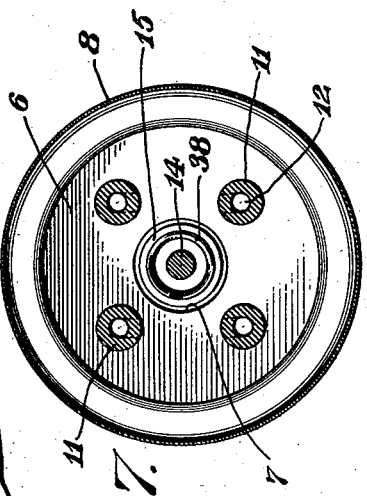
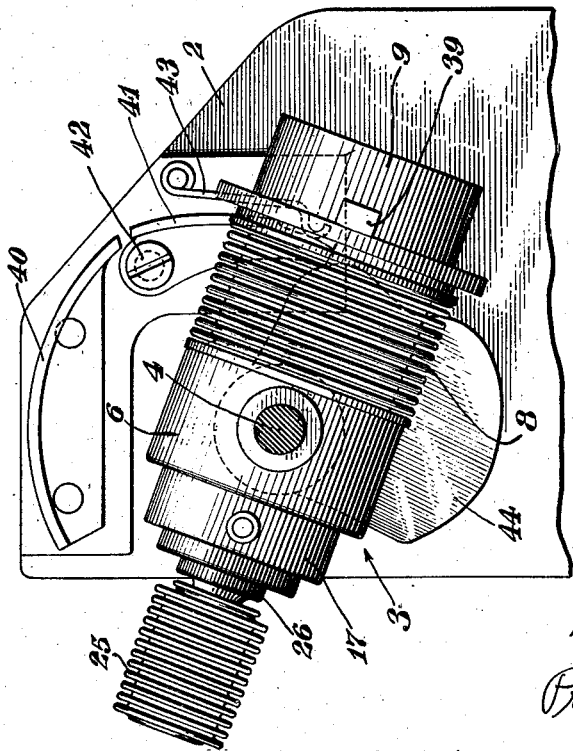
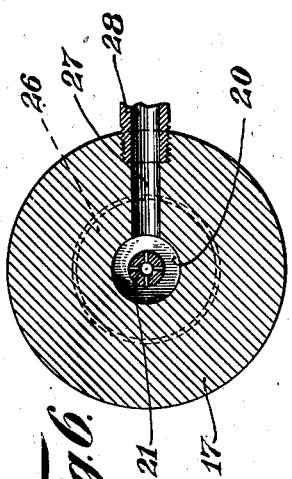
INVENTOR
Marshall H. Ward
BY
Prindle Bean & Mann
ATTORNEY

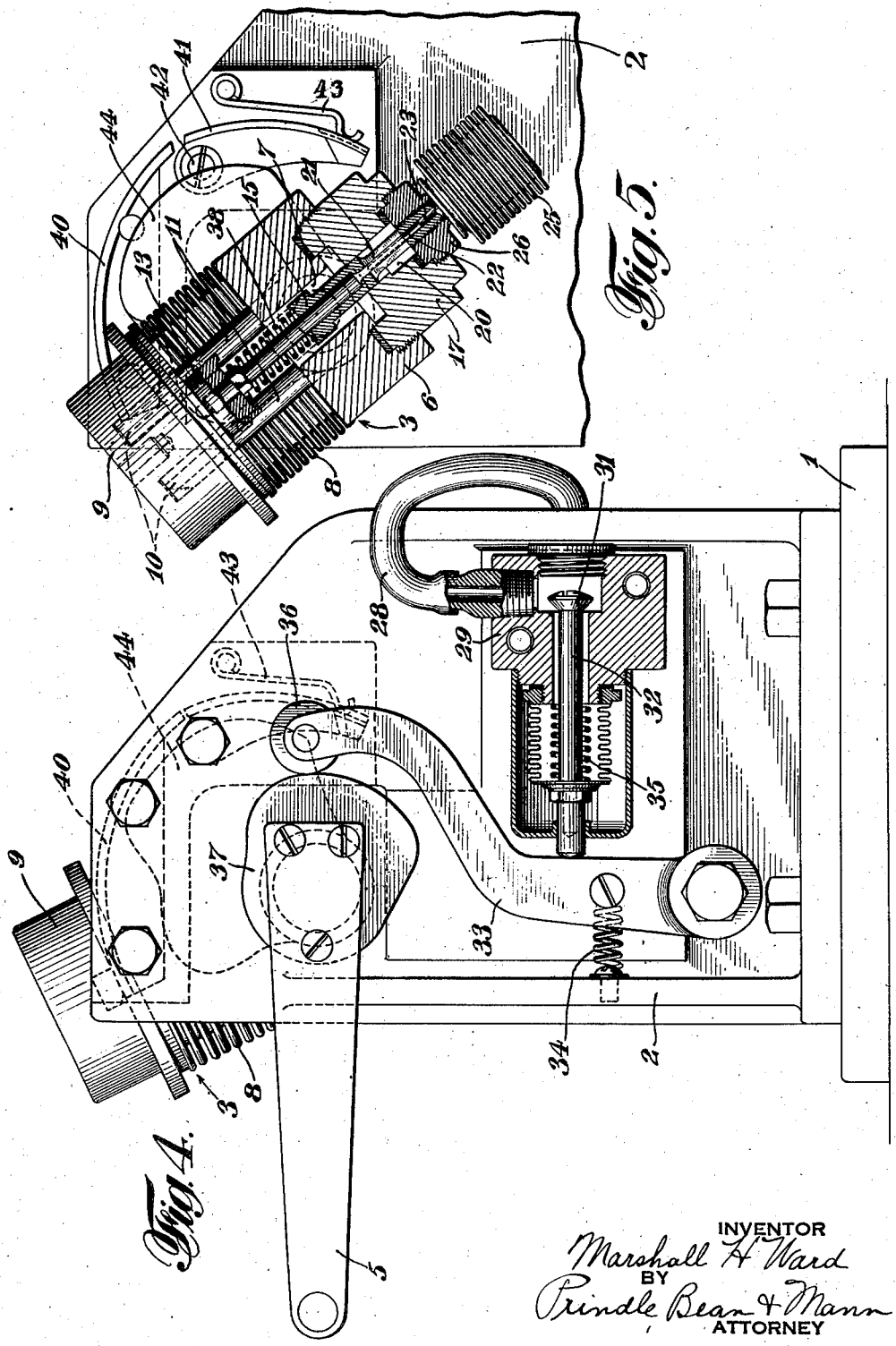

Patented May 4, 1937

2,079,055

UNITED STATES PATENT OFFICE 2,079,055

DEVICE FOR EXHAUSTING AND SEALING BELLOWS AND THE LIKE

Marshall H. Ward, Fairfield, Conn., assignor, by mesne assignments, to Bridgeport Thermostat Company, Inc., Bridgeport, Conn., a corporation of Delaware Application April 28, 1931, Serial No. 533,460

20 Claims. (Cl. 226—82)

This invention relates to improvements in a device or apparatus for exhausting and sealing metallic bellows and the like. These metallic bellows may be formed by various methods and upon various machines and are formed with corrugated walls so as to be resilient and expansible and contractible. It is desirable to exhaust the air from such devices and seal them when in an exhausted condition, and the present apparatus is designed for that purpose.

It includes a barrel member having an expansible and contractible chamber or compartment rotatably mounted and having a fitting to receive a bellows assembly, the interior being connected to a pipe or other conduit leading to a suitable air exhausting medium and having a valve for controlling said conduit, a hammer associated with said barrel member for driving a sealing pin into the opening in the end of the bellows assembly and means for moving and holding the barrel member in an extended or expanded position and operating the valve while in that position to permit the exhaustion of air from the barrel member and the bellows, said holding means being released after the air is exhausted to permit the barrel member to collapse and thus cause the hammer member to drive the pin into the opening of the bellows assembly while the air is exhausted therefrom.

The apparatus is simple, composed of few parts, manually operated and capable of good production and operation by unskilled labor.

To the accomplishment of the foregoing and such other objects as may hereinafter appear, this invention consists in the construction, combination and arrangement of parts hereinafter described and then sought to be defined in the appended claims, reference being had to the accompanying drawings forming a part hereof and which show, merely for the purpose of illustrative disclosure, a preferred embodiment of my invention, it being expressly understood, however, that various changes may be made in practice within the scope of the claims without digressing from my inventive idea.

In the drawings—

Figure 2 is a side elevation of a portion of the mechanism shown in loading position and before any rotating movement has occurred.

Figure 3 is a view of the same parts shown in Figure 2 after a partial rotating movement has occurred and at or about the time of the beginning of the air exhausting operation.

Figure 4 is a side elevation of the device or apparatus as a whole, the valve for controlling the exhausting operation being shown in section and the parts being shown in the same position as Figure 1 just previous to the collapsing and sealing movement.

Figure 5 is a view of the same parts as shown in Figure 3, parts being shown in section, at the completion of the rotating movement and showing the collapse of the expansible chamber or compartment and the driving of the sealing pin into the bellows opening.

Figure 6 is a transverse cross section taken substantially on line 6—6 of Figure 1; and Figure 7 is a transverse cross section taken substantially on line 7—7 of Figure 1.

Figure 1:
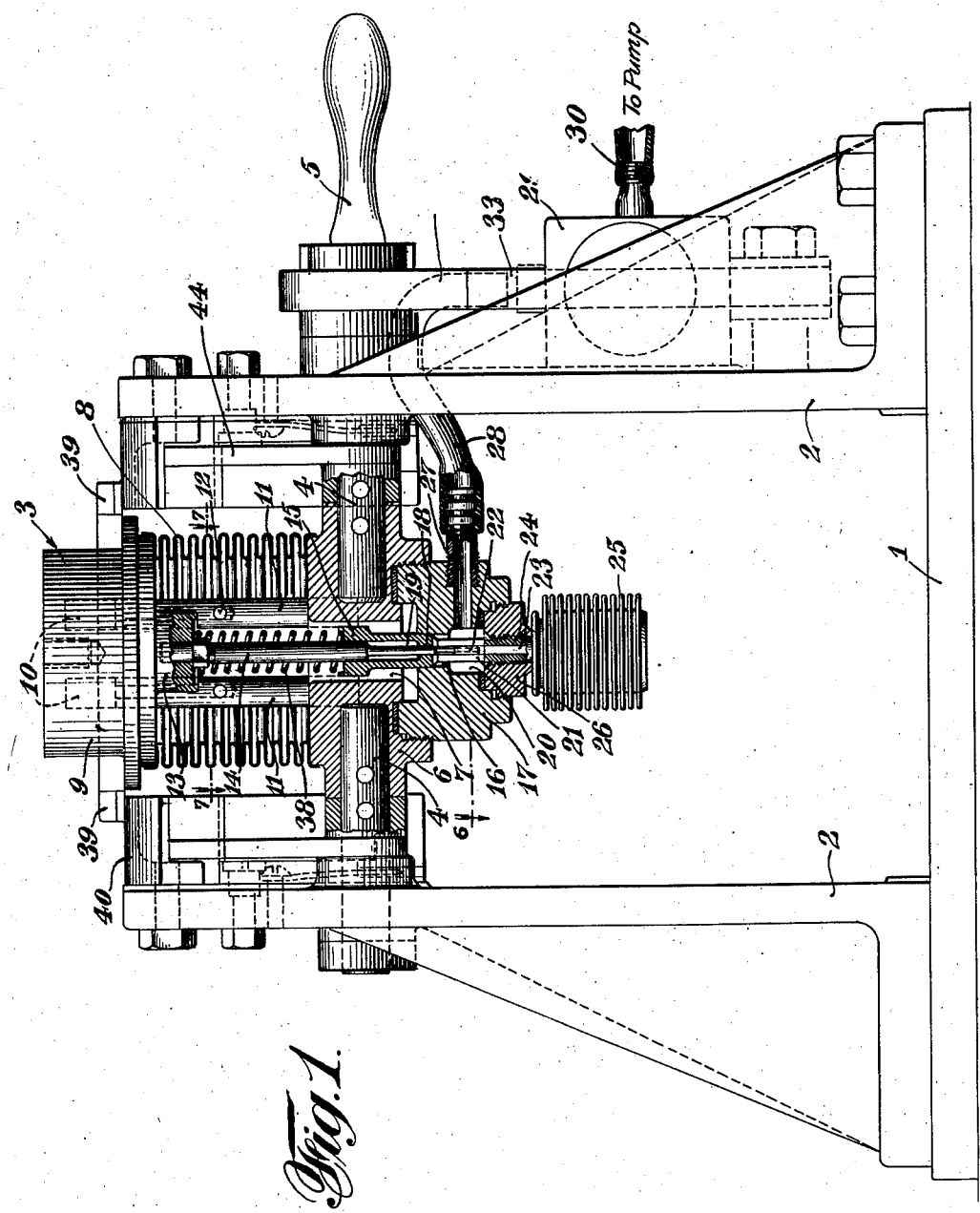
Figure 1 represents a front elevation of an apparatus or device constructed to embody my invention, parts being shown in section to facilitate the disclosure.

Referring now to the drawings, the numeral 1 designates a suitable base which is provided with the side frame or supporting members 2, extending upwardly therefrom. These side frame members are spaced apart a sufficient distance to receive the rotatable barrel member 3, which is rotatably mounted in the side frame members on trunnions 4 and adapted to be rotated manually by means of the handle or crank 5.

The barrel member includes the body portion 6 to which the trunnions 4 are fixedly secured, this body portion being provided with a central bore or passage 7 and receiving and supporting a circular flexible metallic wall 8, on top of which is mounted a circular head 9, thus forming an expansible and contractible flexible-walled chamber or compartment. The head 9 is preferably provided on its inside with a plurality of sockets or recesses 10, each being adapted to slidably receive the upper end of a vertically arranged shaft or rod 11, which is drilled and vented, as at 12, to prevent trapping of air in said recesses or sockets 10.

Said head 9 is provided with a depending stud or projection 13 to which is connected an elongated hammer member 14. The lower end of the hammer member is slidably mounted in a suitable guide or support 15, the lower end of which is positioned in a bore 16 of a fitting member 17. This fitting member is fixedly secured in position to said body member 6. The guide or support 15 is provided with the restricted bore or passage 18 to slidably receive the reduced end 19 of said hammer member 14. The fitting member 17 is provided with an enlarged chamber or compartment 20 in which is positioned a collet or pin-holding member 21. This collet is adapted to hold the pin (preferably tapered) 22 in position to be driven into the reduced tapered bore 23 formed in the threaded nipple 24 which is secured to the end of the metallic bellows 25. This threaded nipple 24 is removably screwed into a correspondingly threaded bore in the nut member 26, which is fixedly screwed into the lower end of the fitting 17.

A port or passage 27 is provided in said fitting 17 to connect the chamber or air compartment 20 with the pipe, tube, or other conduit 28, leading to a valve casing 29 mounted on one of the side frames 2, which valve casing is connected to a suitable vacuum or exhaust pump by means of the conduit 30, (see Figure 1).

The valve 31 has its stem or rod 32 projecting through the casing to be engaged by the lever or arm 33 which is pivotally mounted upon one of the side frames 2, and is normally under the influence of spring 34, and therefore held away from the end of the valve rod or stem 32. The valve is normally held in closed position by means of spring 35. The upper end of lever or arm 33 is provided with roller 36 which engages the cam 37 secured to one of said trunnions 4 to rotate therewith, whereby said valve 31 is opened at a certain point in the rotation of the barrel member.

Now to return to the barrel member, a spring 38 is positioned around the elongated hammer member 14 and engages the upper end of the guide or support 15, thus acting to hold the collet down in proper position, and also to oppose the force of the downward movement of the hammer, and may be of any desired strength to accomplish this purpose properly.

The head 9 is provided with a plurality of lateral extensions or lugs 39 which are adapted to rest and move upon a curved track provided on the inside of each of said side frames 2. This track includes a stationary or fixed portion 40, and a movable or pivoted portion 41, the faces of both of said portions being of substantial width to afford extended bearing for said lugs 39. The movable portion 41 of the track is pivoted to the side frame, as at 42, and is normally forced by means of a spring element 43 into a position out of alinement or continuity with the fixed portion 40 of the track. This movable portion of the track is adapted to be moved into alinement or continuity with the fixed portion of the track by means of cam members 44 mounted upon and secured to said trunnions to rotate therewith, these cam members being adapted to engage the ends of the movable portions of the track to move them outward into alinement with the fixed portions of the track at a proper time in the cycle of operation.

The operation of this device is as follows. A bellows or similar article 25 having the threaded nipple 24 is screwed into position in the open end of the barrel member 3 after the tapered pin 22 has been placed in position in the collet 21. The parts are preferred in substantially the position shown in Figure 2 with the lugs or extensions 39 of the head below and outside the lower end of the movable section 41 of the track. The operating handle or lever 5 is then in a position somewhat over 90° from that shown in Figure 4, and is pulled or turned upwardly so that the barrel is moved from the position in Figure 2 and to the position shown in Figure 3. As the barrel is turned the face of the cam member 44 engages the end of movable section 41 of the track and forces it outwardly. As the lugs or extensions 39 are in engagement with said track, or in its path of movement, they are eventually engaged by the track so that the head of the barrel member is moved outwardly to cause the chamber member to extend or expand to the position substantially shown in Figure 3. As the rotating movement continues the lugs or extensions engage the stationary section of the track, so that the chamber is held in its expanded or extended condition. When the barrel is at or about the position shown in Figure 3, the cam 37 engages the roller 36 on the end of lever or arm 33 and causes the lever or arm to engage the end of the valve rod or stem 32 and move the valve off its seat. This results in placing the interior of the barrel in communication with the vacuum or exhaust pump, so that the air is exhausted from the expansible chamber or compartment and also from the bellows, the tapered pin 22 being forced up into the collet due to the escape of air from the interior of the bellows 25.

When the barrel reaches the end of the tracks 40 the lugs 39 become free from engagement therewith and permit the collapse of the chamber or compartment due to the action of the resilient walls thereof (see Figure 5). This action is very sharp and in the form of a snap, and results in driving the hammer 14 downwardly against the tapered pin 22 to drive the same into the tapered bore 23 in the threaded nipple 24 on the end of the bellows 25. The bellows is, therefore, still in an exhausted and collapsed condition. The barrel is then returned to its loading position (Figure 2) by rotating the crank or handle 5, and the sealed bellows is removed. During this return movement, the lugs 39 on the head pass on the underside of the track sections 40, 41, because of the collapsed condition of the expansible and contractible chamber 8. This completes the cycle of operation.

What I claim is:

1. A device of the character described, including in combination, an expansible and contractible flexible walled chamber having a head member with a hammer member connected thereto, means for holding a bellows assembly in communication with said chamber, said chamber having a connection to a vacuum or exhaust pump and a valve interposed in said connection, means for normally holding the chamber in its expanded position and means for opening said valve to reduce the pressure in said chamber and said bellows assembly.

2. A device of the character described, including, in combination, an expansible and contractible flexible walled chamber having a head member with a hammer member connected thereto, means for placing a bellows assembly in communication with said chamber, said chamber having a connection to a vacuum or exhaust pump and a valve interposed in said connection, means for normally holding the chamber in its expanded position, means for opening said valve to reduce the pressure in said chamber and said bellows assembly, and means for releasing said chamber from its held position after the air is exhausted from said chamber and bellows assembly.

3. A device of the character described, including, in combination, an expansible and contractible flexible walled chamber having a head member with a hammer member connected thereto, means for placing a bellows assembly including a bellows in communication with said chamber, said bellows having a reduced opening thereinto, said chamber having a connection to a vacuum or exhaust pump and a valve interposed in said connection, means for holding a pin adjacent said bellows assembly, means for normally holding the chamber in its expanded position and means for opening said valve to reduce the pressure in said chamber and said bellows, means for releasing said chamber from its held position after the air is exhausted from said chamber and bellows, and said hammer member being adapted to drive the pin into said opening into the bellows when said chamber and head member are released.

4. A device of the character described, including, in combination, means for exhausting air from the interior of an expansible and contractible bellows so as to collapse the same, means for holding a pin adjacent the bellows, and means for automatically driving the pin into a reduced aperture into said bellows to seal the same after the air has been exhausted therefrom, said last mentioned means including an expansible and contractible chamber having a hammer member.

5. A device of the character described, including, in combination, a frame, an expansible and contractible chamber member rotatably mounted in said frame and having a head, means associated with said chamber member for receiving a bellows assembly including a bellows and a threaded nipple, said chamber member having a connection to a vacuum or exhaust pump and a valve interposed in said connection, means on said frame for engaging said head to hold the chamber member in expanded position during a certain path of movement and means for opening said valve during said movement to reduce the pressure in said chamber and said bellows, said head being released at the end of said path of movement to permit the collapse of said chamber member.

6. A device of the character described, including, in combination, a frame, an expansible and contractible chamber member rotatably mounted in said frame and having a head, means associated with said chamber member for receiving a bellows assembly including a bellows and a threaded nipple, said chamber member having a connection to a vacuum or exhaust pump and a valve interposed in said connection, means on said frame for engaging said head to hold the chamber member in expanded position during a certain path of movement and means for opening said valve during said movement to reduce the pressure in said chamber and said bellows, said head being released at the end of said path of movement to permit the collapse of said chamber member, and a hammer member operatively connected to said head member and adapted to drive a pin into said threaded nipple in the bellows when the head member is released.

7. A device of the character described, including, in combination, a frame, an expansible and contractible chamber member rotatably mounted in said frame and provided with a fitting adapted to receive a bellows assembly including a bellows and a reduced threaded nipple on the end thereof, said fitting having a connection to air exhausting means with a valve in said connection, means on said frame for holding said chamber member in an expanded position during a certain path of movement, and means for opening said valve during said path of movement to permit the exhaustion of air from the bellows during said path of movement, said holding means releasing said chamber member at the end of said path of movement to permit the collapse of the same.

8. A device of the character described, including, in combination, a frame, an expansible and contractible chamber member rotatably mounted in said frame and provided with a fitting adapted to receive a bellows assembly including a bellows and a reduced threaded nipple on the end thereof, said fitting having a connection to air exhausting means with a valve in said connection, means on said frame for holding said chamber member in an expanded position during a certain path of movement, and means for opening said valve during said path of movement to permit the exhaustion of air from the bellows during said path of movement, said holding means releasing said chamber member at the end of said path of movement to permit the collapse of the same, and a hammer member associated with said chamber member adapted to drive a pin into said threaded nipple on the bellows when said chamber member collapses.

9. A device of the character described, including, in combination, a frame, an expansible and contractible, flexible walled chamber member having a head with a hammer member connected thereto, said chamber member having a fitting adapted to receive a bellows assembly including a bellows and a threaded nipple, a collet provided in said fitting and adapted to receive a pin to fit into said nipple, said fitting having a connection to means for exhausting air from said chamber member and said bellows, and a valve interposed in said connection, means on said frame for engaging said head and holding said chamber member in expanded position during a certain path of movement, means for opening said valve during said path of movement to exhaust the air from said chamber member and from said bellows, said holding means releasing said head at the end of said path of movement to permit the collapse of the same under the reduced pressure therein and causing said hammer member to drive said pin into said nipple.

10. In combination, in a device of the character described, a rotatably mounted expansible and contractible chamber member provided with a fitting adapted to receive a bellows assembly and having a connection with means for exhausting air therefrom, means for holding said chamber member in an expanded position during a certain path of movement during which the air is exhausted therefrom and then releasing said chamber member to permit it to collapse, said means including an arc-shaped track and extensions on said chamber member adapted to rise on said track, said track having a movable section and means for moving said section outward into continuity with the track as a whole after said extensions are positioned outside of said movable section of track.

11. In combination, in a device of the character described, a rotatably mounted expansible and contractible chamber member provided with a fitting adapted to receive a bellows assembly and having a connection with means for exhausting air therefrom, means for holding said chamber member in an expanded position during a certain path of movement during which the air is exhausted therefrom and then releasing said chamber member to permit it to collapse.

12. In combination, in a device of the character described, a rotatably mounted expansible and contractible chamber member provided with a fitting adapted to receive a bellows assembly and having a connection with means for exhausting air therefrom, means for holding said chamber member in an expanded position during a certain path of movement during which the air is exhausted therefrom and then releasing said chamber member to permit it to collapse, said means including an arc-shaped track and extensions on said chamber member adapted to ride on said track.

13. A device for exhausting and sealing corrugated metallic bellows and the like, including, a frame, a barrel member rotatably mounted with respect to said frame so as to be manually moved, said barrel member having a head, an expansible and contractible, flexible walled chamber having a fitting adapted to receive a bellows assembly including a bellows, said fitting having a connection with means for exhausting the air from said bellows and said chamber, and a valve interposed in said connection, a curved track on said frame, extensions associated with said head and adapted to engage said track during a certain path of movement to exhaust the air from said chamber and said bellows, said extensions being released from said track at the end of said path of movement to permit the collapse of said chamber.

14. A device for exhausting and sealing corrugated metallic bellows and the like, including, a frame, a barrel member rotatably mounted with respect to said frame so as to be manually moved, said barrel member having a head, an expansible and contractible, flexible walled chamber having a fitting adapted to receive a bellows assembly, said fitting having a connection with means for exhausting the air from said bellows assembly and said chamber, and a valve interposed in said connection, a curved track on said frame, extensions associated with said head and adapted to engage said track during a certain path of movement, means to open said valve to exhaust the air from said chamber and said bellows assembly during said path of movement, said extensions being released from said track at the end of said path of movement to permit the collapse of said chamber, a hammer associated with said head and adapted to drive a pin into the opening of said bellows assembly when said chamber collapses so as to seal the bellows assembly when in exhausted condition.

15. A device for exhausting and sealing corrugated metallic bellows and the like, including, a frame, a barrel member rotatably mounted with respect to said frame so as to be manually moved, said barrel member having a head, an expansible and contractible, flexible walled chamber having a fitting adapted to receive a bellows assembly, said fitting having a connection with means for exhausting the air from said bellows assembly and said chamber, and a valve interposed in said connection, a curved track on said frame, extensions associated with said head and adapted to engage said track during a certain path of movement, means to open said valve to exhaust the air from said chamber and said bellows, said extensions being released from said track at the end of said path of movement to permit the collapse of said chamber, a hammer associated with said head and adapted to drive a pin into the opening of said bellows assembly when said chamber collapses so as to seal the bellows assembly when in exhausted condition, said extensions passing under said track when said barrel is rotated in the opposite direction to a loading position.

16. A device for exhausting and sealing corrugated metallic bellows and the like, including, a frame, a barrel member rotatably mounted with respect to said frame so as to be manually moved, said barrel member having a head, an expansible and contractible, flexible walled chamber having a fitting adapted to receive a bellows assembly, said fitting having a connection with means for exhausting the air from said bellows assembly and said chamber, and a valve interposed in said connection, a curved track on said frame, extensions associated with said head and adapted to engage said track during a certain path of movement, means to open said valve to exhaust the air from said chamber and said bellows assembly, said extensions being released from said track at the end of said path of movement to permit the collapse of said chamber, a hammer associated with said head and adapted to drive a pin into the opening of said bellows assembly when said chamber collapses so as to seal the bellows assembly when in exhausted condition, said extensions passing under said track when said barrel is rotated in the opposite direction to a loading position, a section of said track being pivoted and being normally in a distorted position with respect to the remainder of said track, and means associated with said barrel to move said pivoted section of track into continuity with the remainder of the track after the extensions of said barrel have been positioned beyond the same and thereby cause said chamber to expand to its extended position during the initial stage of rotation of the barrel member.

17. A device of the character described, which includes, in combination, an expansible and contractible flexible walled chamber provided with a hammer member, means for placing a bellows in communication with said chamber, means whereby said chamber may be connected to a vacuum or exhaust pump, a valve in said last mentioned means, means for normally holding said chamber in its expanded position, means for opening said valve to reduce the pressure in said chamber and the bellows, and means for releasing said chamber from its held position after the air is exhausted from said chamber and the bellows whereby the hammer member is released.

18. A device of the character described, including, in combination, an expansible and contractible flexible walled chamber having a head member with a hammer member connected thereto, means for placing a bellows assembly in communication with said chamber, means for normally holding the chamber in its expanded position, means for exhausting the air from said chamber and the bellows assembly, and means for releasing said chamber from its held position after the air is exhausted from said chamber and bellows assembly so as to force the hammer member downwardly.

19. A device of the character described, including, in combination, means for exhausting the air from a receptacle and means for automatically driving a pin to seal a reduced opening into said receptacle after the air is exhausted therefrom, said last mentioned means including an expansible and contractible chamber having a hammer member.

20. A device of the character described, including, in combination, supporting means for holding a bellows assembly thereon in communication with an exhaust or vacuum pump, means for holding a pin adjacent said bellows assembly, an expansible and contractible flexible walled chamber provided with a hammer member and in communication with said bellows assembly, means for holding said chamber in expanded position and means for releasing said chamber, whereby the hammer member drives the pin into the bellows assembly after the air is exhausted from said bellows assembly.

MARSHALL H. WARD.